United States Patent
Smalley

(10) Patent No.: US 9,553,849 B1
(45) Date of Patent: Jan. 24, 2017

(54) SECURING DATA BASED ON NETWORK CONNECTIVITY

(71) Applicant: Howard Smalley, Exeter (GB)

(72) Inventor: Howard Smalley, Exeter (GB)

(73) Assignee: CA, Inc., New York, NY (US)

(*) Notice: Subject to any disclaimer, the term of this patent is extended or adjusted under 35 U.S.C. 154(b) by 319 days.

(21) Appl. No.: 14/024,158

(22) Filed: Sep. 11, 2013

(51) Int. Cl.
*H04L 29/06* (2006.01)
*G06F 21/88* (2013.01)

(52) U.S. Cl.
CPC ........... *H04L 63/0428* (2013.01); *G06F 21/88* (2013.01)

(58) Field of Classification Search
None
See application file for complete search history.

(56) References Cited

U.S. PATENT DOCUMENTS

| | | | | |
|---|---|---|---|---|
| 8,675,221 B1* | 3/2014 | Tahiliani et al. | ............... | 705/3 |
| 2005/0008160 A1* | 1/2005 | Izawa | ............... | H04L 12/2803 380/270 |
| 2006/0045270 A1* | 3/2006 | Cohen | ............... | G06F 21/6218 380/268 |
| 2006/0265737 A1* | 11/2006 | Morris | ............... | 726/3 |
| 2007/0130457 A1* | 6/2007 | Kamat et al. | ............... | 713/151 |
| 2007/0174909 A1* | 7/2007 | Burchett | ............... | G06F 21/602 726/18 |
| 2008/0034224 A1* | 2/2008 | Ferren | ............... | G06F 21/88 713/193 |
| 2008/0052384 A1* | 2/2008 | Marl et al. | ............... | 709/223 |
| 2008/0109679 A1* | 5/2008 | Wright et al. | ............... | 714/37 |
| 2008/0126261 A1* | 5/2008 | Lovett | ............... | G06Q 20/04 705/72 |
| 2009/0024844 A1* | 1/2009 | Sriram | ............... | H04L 63/0428 713/155 |
| 2010/0235514 A1* | 9/2010 | Beachem | ............... | 726/1 |
| 2010/0281247 A1* | 11/2010 | Wolfe | ............... | H04L 9/00 713/150 |
| 2011/0131418 A1* | 6/2011 | Teng | ............... | G06F 21/57 713/185 |
| 2011/0154432 A1* | 6/2011 | Basavaraj et al. | ............... | 726/1 |
| 2012/0185910 A1* | 7/2012 | Miettinen et al. | ............... | 726/1 |
| 2013/0254831 A1* | 9/2013 | Roach et al. | ............... | 726/1 |
| 2014/0013420 A1* | 1/2014 | Picionielli | ............... | G06F 21/88 726/17 |
| 2014/0136835 A1* | 5/2014 | Sharpe | ............... | G06F 21/606 713/153 |
| 2014/0189483 A1* | 7/2014 | Awan | ............... | G06F 21/62 715/212 |

\* cited by examiner

*Primary Examiner* — Peter Poltorak
(74) *Attorney, Agent, or Firm* — Baker Botts L.L.P.

(57) ABSTRACT

A method includes identifying a trusted computer network. The method also includes monitoring a plurality of active network connections. The method further includes determining that the trusted computer network is unavailable by determining that the plurality of active network connections does not comprise the trusted computer network. The method additionally includes, in response to determining that the trusted computer network is unavailable, securing sensitive data documents. Securing the sensitive data documents includes, for each data document of a plurality of data documents, determining a respective classification of a plurality of classifications. The plurality of classifications includes a sensitive classification based on predetermined criteria. Securing the sensitive data documents also includes encrypting particular data documents having the sensitive classification.

17 Claims, 2 Drawing Sheets

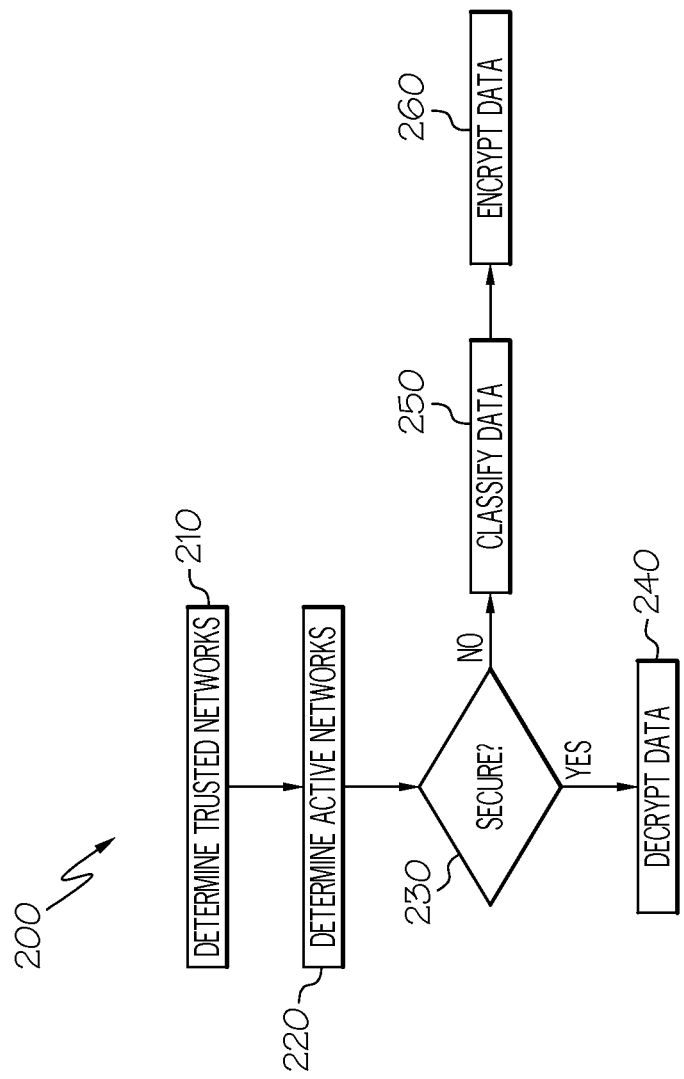

SECURING DATA BASED ON NETWORK CONNECTIVITY

BACKGROUND

The disclosure relates generally to data security, and more specifically to a system and method for securing data based on network connectivity.

SUMMARY

According to one embodiment of the disclosure, a method includes identifying a trusted computer network. The method also includes monitoring a plurality of active network connections. The method further includes determining that the trusted computer network is unavailable by determining that the plurality of active network connections does not comprise the trusted computer network. The method additionally includes, in response to determining that the trusted computer network is unavailable, securing sensitive data documents. Securing the sensitive data documents includes, for each data document of a plurality of data documents, determining a respective classification of a plurality of classifications. The plurality of classifications includes a sensitive classification based on predetermined criteria. Securing the sensitive data documents also includes encrypting particular data documents having the sensitive classification.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

FIG. 2 illustrates a flowchart of a method for securing data based on network connectivity in accordance with another embodiment.

DETAILED DESCRIPTION

Figure 1:
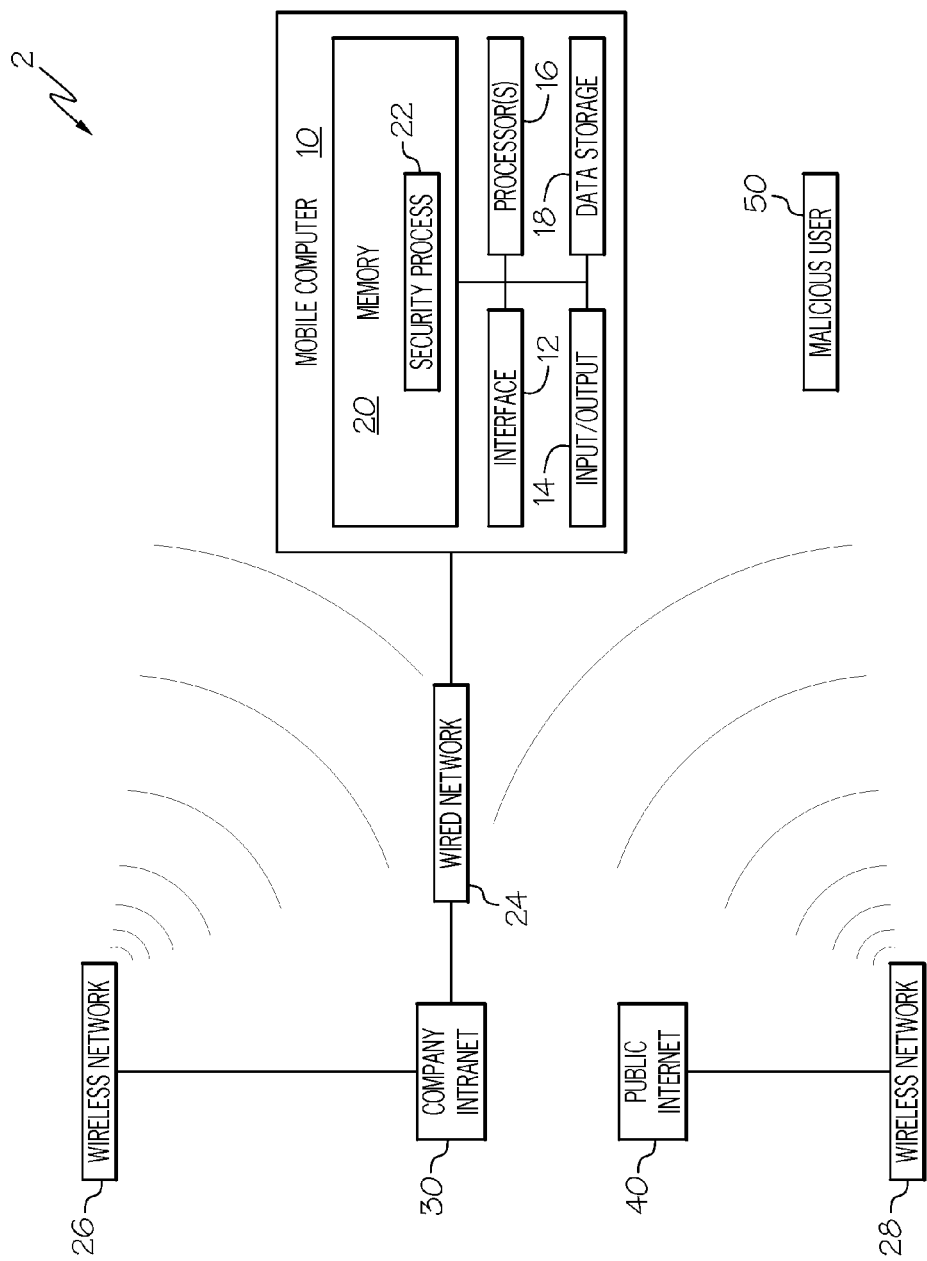
FIG. 1 illustrates a block diagram of a system for securing data based on network connectivity in accordance with a particular embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer-readable medium that when executed can direct a computer, other programmable data processing apparatus, or other devices to function in a particular manner, such that the instructions when stored in the computer-readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Hackers and malicious users try to find weak links in corporate, government, and personal network and data systems. The advent of personal mobile computing devices such as laptop computers, tablet personal computers, smart-phones, and personal digital assistants (PDAs) has widely expanded the availability of kinks in data security armor. Such mobile devices frequently contain flash or hard disk memory storage and are capable of storing significant amounts of data. Further, employees of both government and private organizations frequently perform business operations on mobile devices. For example, a corporate executive receives a memo with valuable inside company information in it on her BlackBerry® smart-phone over a company network. Such information is valuable to malicious users, who could use the information to exploit markets with profitable stock trades. The demand for such information is high, and malicious hackers have devised complicated schemes by which to retrieve such information.

When the corporate executive, for example, enters a coffee shop, his mobile device automatically connects to the wireless network available to customers. A malicious user connected to the public network is waiting to exploit the mobile device and extract the valuable information. Additionally, mobile devices are often the subject of theft, potentially exposing even more sensitive information.

In accordance with embodiments of the present disclosure, a system for securing data is disclosed. The system may classify and encrypt sensitive data based on network connectivity, and may prevent malicious users from accessing valuable data from mobile devices.

FIG. 1 illustrates one embodiment of a system 2 for securing data based on network connectivity. System 2 contains a mobile computer 10, wireless networks 26 and 28, and wired network 24. For example, system 2 illustrates an environment mobile devices encounter over the course of a day. Such an environment includes a corporate office, where an employee brings a mobile computing device (e.g., a tablet, laptop, or smart-phone) to work. While at the office, mobile computer 10 connects to wireless and wired networks, such as wireless network 26 and wired network 24. The employee uses mobile computer 10 to perform work tasks such as drafting emails, designing projects, capturing images, uploading files to corporate servers, and downloading and viewing files. The mobile device is also brought home, and connects to different wireless networks 28 connected to public internet 40 along the way. Wireless network 28 may further be shared with other users. For example, a malicious user 50 may share wireless network 28 with mobile computer 10, and may compromise wireless network 28 security and default mobile computer 10 network security.

System 2 secures sensitive data on mobile computer 10, memory 20, and data storage 18 by detecting changes in network connectivity, classifying the data stored on memory 20 and data storage 18, and encrypting sensitive data when connectivity with predetermined networks is disconnected. System 2 thus prevents data leakage of sensitive information on public and unsecured networks, where malicious users may gain access to mobile computer 10.

Wireless network 26 is configured as an access point, and is connected to company intranet 30. Such network configurations are secured by, for example, Wired Equivalent Privacy ("WEP"), Wi-Fi Protected Access ("WPA"), and Wi-Fi Protected Access 2 ("WPA2"). Wireless network 26 may include any wireless security protocol designed to prevent unauthorized access and damage to computers using such wireless networks. Mobile computer 10 includes an interface 12, used to connect with both wireless and wire-line computer networks. Interface 12 includes wireless network interface controllers ("WNIC"), and network interface controller cards ("NIC" cards), such as universal serial bus ("USB") WNIC devices, Bluetooth devices, integrated NIC devices, and Peripheral component Interconnect ("PCI") bus connected devices. Mobile computer 10, and other computers connected via any of the depicted networks may contain one or more of such devices, and utilize them to transmit data to a corporate intranet 30 and public internet 40.

Wireless networks 26-28 and wired network 24 include any personal area network, local area network ("LAN"), home area network, storage area network ("SAN"), campus area network, backbone network, metropolitan area network, wide area network, enterprise private network, virtual private network, virtual network, and internetworks, and may be interconnected via network hardware components, such as NICs, hubs, bridges, switches, and routers.

The wireless networks enumerated in connection with illustrated wireless networks 26-28 further include any type of wired technology medium, including twisted pair, coaxial cable, and optical fiber. Accordingly, the wired networks enumerated in connection with illustrated wired network 24 further include any type of wireless technologies, including microwave, satellite, cellular, radio and spread spectrum, and infrared ("IR").

Such networks are associated with a variety of unauthorized access methods. These methods include, but are not limited to, accidental association, malicious association, identity theft ("MAC spoofing"), man-in-the-middle attacks, denial of service attacks and network injection attacks. For example, malicious user 50 uses a man-in-the-middle attack to entice computers to log into his computer as a soft access point ("AP"). The hacker then passes along or forwards the received packets to the real AP, and sniffs the network traffic running through his machine. Wireless network hotspots are particularly vulnerable to this sort of attack. For example, a coffee shop sets up a wireless network hotspot, allowing malicious users to pose as access points, forwarding information along to the coffee shop hotspot or other network access point. Thus, a wireless hotspot poses a significant security threat to mobile computing devices containing sensitive information.

Company intranet 30 includes computer networks that use internet protocol ("IP") technology to host and share company information, operational systems, or computing services within an organization. Company intranet 30 hosts private website, shared drives, and provides internet access with strict security firewalls in place to guard against unauthorized access to compromising company data shared via the intranet. For example, an organization hosts a MICROSOFT SHAREPOINT® website for intra-organization collaboration and communication. Organizational members use the site to post ideas, brainstorm, and collaborate on new company initiatives. Testing results from recent experiments and feedback from members across the world are served on such sites.

Mobile computer 10 includes any personal digital assistant, enterprise digital assistant, smart-phone, tablet computer, ultra-mobile PC, wearable computer, or laptop PC. In the illustrated embodiment, mobile computer 10 includes memory 20, interface 12, input/output 14, processor(s) 16, and data storage 18. Security process 22 runs in memory 20, determines network connectivity, and secures data in accordance with system 2.

According to one embodiment of the present disclosure, security process 22 receives a list of secure networks. For example, a security patch is pushed to mobile device 10, as a condition of connecting to wireless network 26 or wired network 24. The security patch contains the service set identifier ("SSID") for the extended service set ("ESS") and basic service sets ("BSS") including the access point and all associated stations. Security process 22 scans for active network connections to networks included in the SSID list, conveyed in the security patch. For example, wireless network 26 contains an SSID of "CorporateOfficeNetwork1". Security process 22 scans for active connections to such a wireless network, and secures data based on the connection. Security process 22 further performs a handshake with specific network resources available on "CorporateOfficeNetwork1". Such a procedure ensures against malicious users spoofing network SSIDs in an attempt to circumvent security processes of system 2.

In other embodiments, the user may indicate a preference for connecting to such networks. For example, when the user connects for the first time to a wireless network, the user is presented with a dialogue box asking the user to categorize the network as "public", "private", or "home". In this example, the user selects home. In another example, system 2 provides a dialog box requesting the user select which networks are private. System 2 may provide indications as to which networks qualify as secure, based on their network security scheme. In a particular embodiment, a list of recently discovered networks is populated for the user. The networks requiring no key or password to access are grayed out. The WEP, WPA, and WPA2 (e.g., wireless network 26), and wired (e.g., wired network 24) networks are highlighted and available for selection. The user selects which networks to include as private or secured networks in system 2.

In other embodiments, system 2 uses a predetermined list of secure networks. In this example, security process 22 accesses a list of recently accessed networks. Security process 22 contains a list of preconfigured networks to connect to, and secures data on mobile computer 10 based on the list of network SSIDs.

Security process 22 may further be capable of learning and storing user preferences. For example, when a user attempts to connect to a new computer network, operating system software presents the user with a dialog box to indicate the trust level the network should be granted. Computer network security measures can be taken at the operating system or application level to reduce the risk of malicious attacks on mobile computer 10 when mobile computer 10 is connected to unsecure public networks (e.g., public hot-spots). For example, the operating system may establish a firewall for incoming communications on all ports of mobile computer 10 when mobile computer 10 is connected to untrusted or public networks. Security process 22 may store such public networks, and automatically encrypt or secure sensitive data documents when connected to such networks.

In alternative embodiments, when mobile computer 10 is connected to trusted networks, private networks, and the like, operating system and application level security measures are reduced such that trusted communications, including sensitive data documents, emails, and files, may pass back and forth from mobile computer 10 over the trusted network. In this example, security process 22 may store such trusted networks, and automatically decrypt sensitive data documents located on data storage 18 and memory 20 of mobile computer 10 when mobile computer 10 is connected to such secure, private networks.

FIG. 2 illustrates an embodiment of a method 200 for securing data based on network connectivity. In reference to the depicted embodiment, at step 210 a trusted network is received at, for example, a mobile computer 10. The trusted network may be received in accordance with any of the embodiments as described above with reference to system 2, such as received as a security patch, input by a user, or learned and stored by a security process or application in accordance with the operating system's classification of networks. In other embodiments, a list of trusted networks is received at step 210. For example, several SSIDs of corporate computer networks are pushed to mobile computer 10 upon connecting to a corporate network. The SSIDs correspond to the service set identifiers for the corporate WIFI network access points, located throughout a corporate facility. Those of ordinary skill in the art will understand WIFI networks to refer to any wireless local area network that conforms to the Institute of Electrical and Electronics Engineers ("IEEE") 802.11 standards. However, any type of wireless or wired network may be used in accordance with the present disclosure.

At step 220, the active computer networks are determined. Referring to system 2, the mobile computer 10 may be connected to a wireless computer network. Security process 22 determines the active wireless computer networks on a periodic basis. In another example, security process 22 polls the wireless computer networks that are active on mobile computer 22. Security process 22 may determine such information by sending test packets to access points and determining, based on the responses, what the SSIDs of each connected access point is. In other embodiments, the operating system may supply an API from which to retrieve such current network information.

At step 230, the trusted network and the list of active computer networks, realized in accordance with steps 210-220, are compared to determine whether to secure the sensitive data documents on mobile computer 10. The sensitive data documents are secured when the list of active network connections does not contain the trusted network. In this case, the data documents are classified in accordance with step 250. Classifying data documents comprises searching the data storage and memory of mobile computer 10 and classifying the documents. For example, if no trusted networks are available as active computer networks on mobile computer 10, security process 22 scans the data documents available on data storage 18, and sends the data documents to a classification engine. The classification engine may be part of company intranet 30, or may be running in memory 20 of mobile computer 10.

Examples of data documents include files, emails, archives, databases, xml documents, html documents, text files and other computer readable documents.

In another embodiment, security process 22 determines whether each data document has been changed after it was last classified. For example, if a data document was recently modified by a user of mobile computer 10, the time stamp for the data document indicates a last changed date after a classification date. The classification date may be generated in accordance with classifying documents. In this event, the data document is classified again to ensure no sensitive materials were introduced to the data document during the modification. In another example, a data document was recently downloaded to mobile computer 10, and the data document has not been classified yet. In this case, the data document is not associated with any classification or classification date, and therefore would be classified.

However, if a data document corresponds to a classification, and has not been modified since the last classification occurred, the data document need not be classified again. In other words, only recently modified, created, or downloaded documents are sent to the classification engine. This process reduces the amount of processing time required in order to secure data documents, by weeding out those documents that have already been classified and skipping over them.

Also at step 250, sensitive data documents are classified with a sensitive classification. The sensitive classification may include one classification or a set of classifications that are predetermined to be indicative of sensitive data documents, and thus must be encrypted upon leaving a trusted network. For example, an organization has three tiers of secure document classifications for purposes of a classification engine. Tier 1 corresponds to the top secret, highly confidential information, such as employee personal information and company trade secrets. Tier 2 may correspond to important but less sensitive information, such as projections of financial statements and employee salary information. Tier 3 corresponds to a general company information category, such as employee emails. Such information is sensitive and should not be made public, but does not contain such vital information as tiers 1-2. In such a system, the classification engine may generate four classifications: "tier 1", "tier 2", "tier 3", and "unsensitive". Security process 22 may denominate tiers 1-3 as sensitive information groups and may require encrypting such data documents whenever mobile computer 10 is disconnected from a secure network.

For example, an employee reads her email on mobile computer 10. As part of the email application, some emails and attachments are stored on data storage 18. When mobile computer 10 is disconnected from the trusted network, the employee's emails and attachments remain on data storage 18. Security process 22 scans data storage 18, and classifies documents in accordance with the classification methods as described above. The email and attachment documents are classified as "tier 3" documents and are marked with a time stamp indicating when they were classified. Other documents, such as personal emails, are marked with the "unsensitive" classification.

Moving on to step 260, sensitive data documents are encrypted. In accordance with the above example, the "tier 3" documents are then encrypted such that they may not be read without decrypting them. Thus, malicious users attempting to access such sensitive data may access the documents by theft or cracking mobile computer 10, but are prevented from deciphering the sensitive company information.

"Unsensitive" classified documents are not encrypted, thus saving encryption processing time by limiting the amount of data to be encrypted to only sensitive documents. Further, security process 22 may be configurable by the organization to tweak which documents are categorized as sensitive. For example, in accordance with the above embodiment, security process 22 may treat only "tier 1" and "tier 2" classifications as sensitive. Thus, the company email information discussed in accordance with the above embodiment is not classified. In general, the lower the sensitive document threshold, the more processing is required for encrypting the data classified as sensitive.

If security process 22 determines mobile computer 10 is connected to a trusted network, then sensitive data documents are decrypted in accordance with step 240. For example, mobile computer 10 is connected to wireless network 26, and sensitive data documents that had been encrypted on data storage 18 in accordance with step 260 are decrypted such that they may be read by mobile computer 10 applications. In other words, the sensitive data documents are unlocked for use on mobile computer 10 when mobile computer 10 connects to wireless network 26.

In other embodiments, connecting to wireless network 28 initiates the securing data documents process, even if one trusted network has been established. Such a configuration prevents malicious users from establishing an unsecured network, baiting mobile devices to connect to it in addition to network connections to company networks and thus circumventing the security and encryption measures in place.

Method 200 may additionally include a feedback loop, such that the process is repeated constantly to ensure that sensitive data documents remain secure on mobile computer 10.

The securing data documents process may also include deleting data documents. For example, after the classification step 250, sensitive data documents may be deleted, instead of encrypted, or deleted as part of the encryption process. Further, security process 22 may be configured such that certain sensitive data documents are deleted and other sensitive data documents are encrypted. For example, in accordance with the above embodiment, "tier 1" data documents are deleted from data storage 18 and all "tier 2" data documents on data storage 18 are encrypted for later decryption and use. Such a configuration eliminates the risk of a malicious user decrypting encrypted files by gaining access to a key or decryption device. This treatment is appropriate for highly sensitive, top secret corporate documents, such as trade secrets or non-public company plans.

The encryption may include RSA public-key encryption, or any other encryption or network security algorithm. RSA encryption includes generating large prime numbers, the product of which is published along with an auxiliary value to create a public key. The prime numbers themselves, however, are kept secret. The public keys are used to encrypt messages, but only the secret prime numbers can be used to decrypt the message. In such an algorithm, the prime number must be sufficiently large such that it is difficult to factor the public key to retrieve the prime factors. Other network security or cryptography algorithms, such as symmetric-key cryptography and public-key cryptography, may be used to encrypt the sensitive data documents. Such algorithms may be capable of being broken, but may require exponential processing time with respect to the key length for decryption by brute force methods.

Data documents may be decrypted in accordance with step 240 of method 200 after the active network has been validated. According to a particular embodiment of the present disclosure, wireless network 26 and company intranet 30 are connected to a WINDOWS® Active Directory domain. Data documents may not be decrypted unless mobile computer 10 is authorized and authenticated as a member of the Active Directory domain. Other methods may be used to validate network participation, such as, for example, contacting a predetermined host to confirm network access.

In today's mobile technology driven environment, employees, company agents, and independent contractors are increasingly utilizing smart phones, tablets, and PDAs to get work done, both at home and at the office. As this use of mobile devices for work increases, so do the chances of copying sensitive information onto mobile devices. Once sensitive information is on a mobile device, then the chances of data leakage increase dramatically due to theft, viruses, and malicious users interconnected via WIFI networks employees may inadvertently connect to.

As more and more people are using mobile devices (smart phones, tablets, etc.) for business, the problem of keeping that data secure when the mobile device leaves the corporate environment is becoming more and more important. The embodiments of the present disclosure will classify (and optionally encrypt the data based on the data's classification) all the data on a mobile device when that mobile device leaves the corporate WIFI zone. Therefore, the present disclosure may ensure that any sensitive data is classified, encrypted, and recovered by the device owner before any breach of data occurs. The invention works by monitoring WIFI availability and applying classifications and encryption to the files when the corporate (or any designated "home") WIFI network becomes unavailable.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    storing a plurality of data documents;
    identifying a trusted computer network;
    monitoring a plurality of active network connections;
    determining that the trusted computer network is unavailable by determining that the plurality of active network connections does not comprise the trusted computer network; and
    in response to determining that the trusted computer network is unavailable, securing sensitive data documents, wherein securing the sensitive data documents comprises:
        for each data document of the plurality of data documents, determining a respective classification of a plurality of classifications, the plurality of classifications comprising a sensitive classification based on predetermined criteria; and
        encrypting particular data documents having the sensitive classification;
    determining that the trusted computer network is available by determining that the plurality of active network connections comprises the trusted computer network; and
    in response to determining that the trusted computer network is available, decrypting the particular data documents.

2. The method of claim 1, wherein securing the sensitive data documents further comprises:
    generating the respective classification for each of the plurality of data documents with a classification engine.

3. The method of claim 2, wherein generating the respective classification further comprises generating a classification time stamp for each data document, and wherein the respective classifications are only generated for:
    each respective data document that has been modified since its respective classification time stamp; and
    each data document that does not correspond to any classification.

4. The method of claim 1, wherein encrypting the particular data documents comprises deleting the particular data documents.

5. The method of claim 1, wherein encrypting the particular data documents comprises encrypting the particular data documents using a public-key encryption algorithm.

6. The method of claim 1, wherein the trusted computer network comprises a service set identifier ("SSID").

7. A computer configured to access a storage device, the computer comprising:

a processor; and a non-transitory, computer-readable storage medium storing computer-readable instructions that when executed by the processor cause the computer to perform:
 store a plurality of data documents;
 identifying a trusted computer network;
 monitoring a plurality of active network connections, at least one of which providing access to the trusted network;
 in response to monitoring the plurality of active network connections, determining that the trusted computer network is no longer available by determining that the plurality of active network connections no longer includes the trusted computer network;
 in response to determining that the trusted computer network is unavailable, securing sensitive data documents, wherein securing the sensitive data documents comprises:
  for each data document of the plurality of data documents, determining a respective classification of a plurality of classifications, the plurality of classifications comprising a sensitive classification based on predetermined criteria; and
  encrypting particular data documents having the sensitive classification;
 determining that the trusted computer network is available by determining that the plurality of active network connections comprises the trusted computer network; and
 in response to determining that the trusted computer network is available, decrypting the particular data documents.

8. The computer of claim 7, wherein securing the sensitive data documents further comprises:
 generating the respective classification for each of the plurality of data documents with a classification engine.

9. The computer of claim 8, wherein generating the respective classification further comprises generating a classification time stamp for each data document, and wherein the respective classifications are only generated for:
 each respective data document that has been modified since its respective classification time stamp; and
 each data document that does not correspond to any classification.

10. The computer of claim 7, wherein encrypting the particular data documents comprises deleting the particular data documents.

11. The computer of claim 7, wherein encrypting the particular data documents comprises encrypting the particular data documents using a public-key encryption algorithm.

12. The computer of claim 7, wherein the trusted computer network comprises a service set identifier ("SSID").

13. A computer program product comprising:
 a non-transitory computer-readable storage medium having computer-readable program code embodied therewith, the computer-readable program code comprising:
  computer-readable program code configured to store a plurality of data documents;
  computer-readable program code configured to identify a trusted computer network;
  computer-readable program code configured to monitor a plurality of active network connections;
  computer-readable program code configured to determine that the trusted computer network is unavailable by determining that the plurality of active network connections does not comprise the trusted computer network;
  computer-readable program code configured to, in response to determining that the trusted computer network is unavailable, secure sensitive data documents, wherein securing the sensitive data documents comprises: for each data document of the plurality of data documents, determining a respective classification of a plurality of classifications, the plurality of classifications comprising a sensitive classification based on predetermined criteria; and encrypting particular data documents having the sensitive classification; computer-readable program code configured to determine that the trusted computer network is available by determining that the plurality of active network connections comprises the trusted computer network; and
  in response to determining that the trusted computer network is available, decrypting the particular data documents.

14. The computer program product of claim 13, wherein securing the sensitive data documents further comprises:
 generating the respective classification for each of the plurality of data documents with a classification engine.

15. The computer program product of claim 14, wherein generating the respective classification further comprises generating a classification time stamp for each data document, and wherein the respective classifications are only generated for:
 each respective data document that has been modified since its respective classification time stamp; and
 each data document that does not correspond to any classification.

16. The computer program product of claim 13, wherein encrypting the particular data documents comprises deleting the particular data documents.

17. The computer program product of claim 13, wherein encrypting the particular data documents comprises encrypting the particular data documents using a public-key encryption algorithm.

* * * * *